United States Patent

Fauss et al.

[11] 4,020,354
[45] Apr. 26, 1977

[54] TREATMENT OF TIRE MAKING COMPONENTS

[75] Inventors: Glenn C. Fauss, Seville, Ohio; Robert J. Scribner, Lynchburg, Va.

[73] Assignee: The Goodyear Tire & Rubber Company, Akron, Ohio

[22] Filed: Sept. 13, 1976

[21] Appl. No.: 722,977

Related U.S. Application Data

[63] Continuation of Ser. No. 580,003, May 22, 1975, abandoned.

[52] U.S. Cl. .......................... 250/492 B; 250/453; 198/461
[51] Int. Cl.² ........................................ H01J 37/06
[58] Field of Search ............... 250/492 B, 453, 442, 250/513, 449, 445; 198/461

[56] References Cited
UNITED STATES PATENTS

| | | | |
|---|---|---|---|
| 2,888,129 | 5/1959 | Chapman | 198/76 |
| 2,920,503 | 1/1960 | Burrows | 198/76 |
| 3,168,189 | 2/1965 | Lueltke | 198/76 |
| 3,433,947 | 3/1968 | Emanuelson et al. | 250/492 B |
| 3,880,420 | 4/1975 | Martin | 198/76 |

*Primary Examiner*—Alfred E. Smith
*Assistant Examiner*—B. C. Anderson
*Attorney, Agent, or Firm*—F. W. Brunner; R. S. Washburn

[57] ABSTRACT

Apparatus for treating running lengths of tire ply stock, gum stock, chafer, chipper, and similar components of diverse widths by electron radiation from a high voltage electron accelerator in a shielded chamber, facilitates handling by plural parallel conveyors which can operate individually for lesser widths or in synchronism as one conveyor to carry greater widths through the treatment chamber. Letoff and windup units are associated with individual conveyors and with the combined conveyors.

3 Claims, 5 Drawing Figures

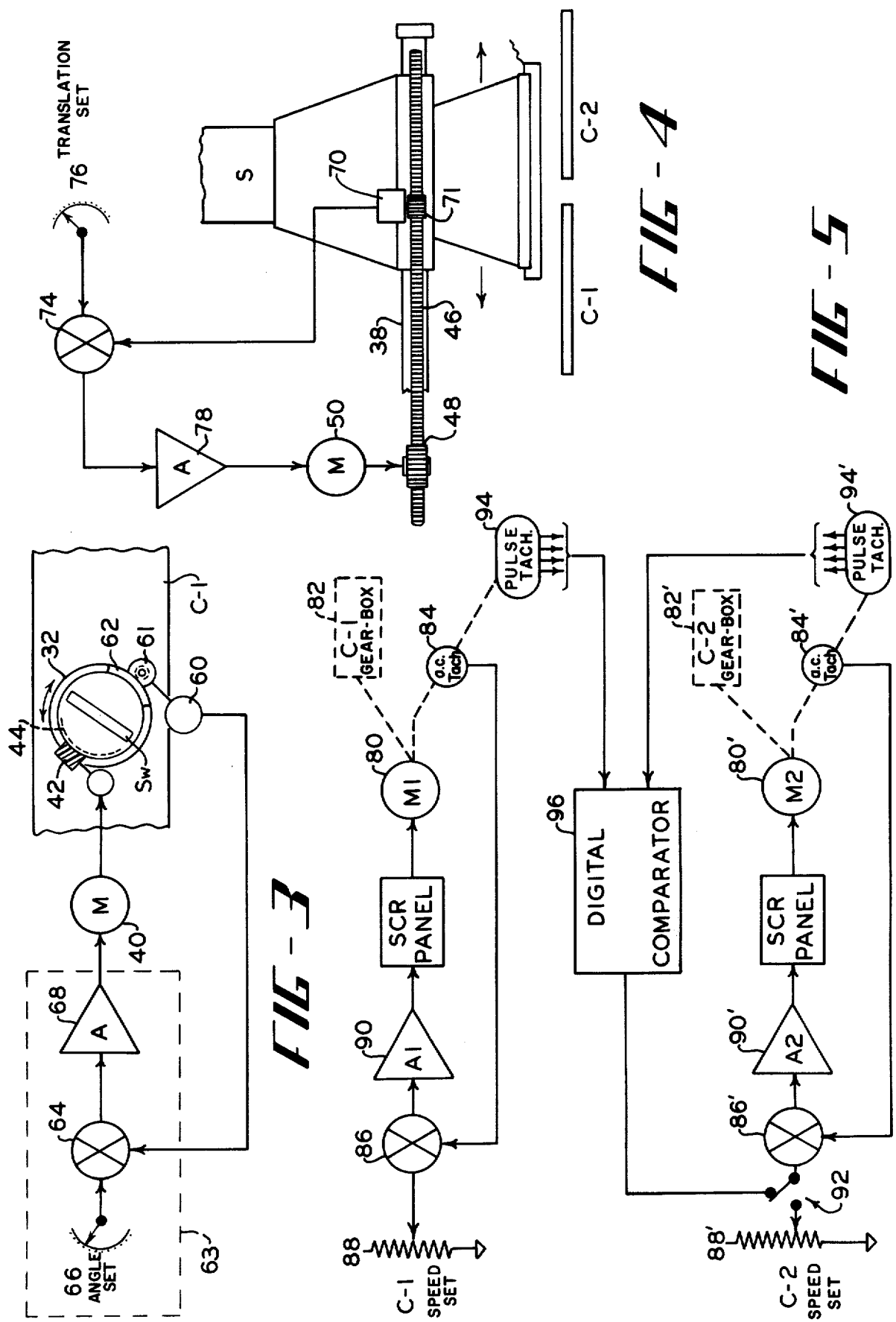

TREATMENT OF TIRE MAKING COMPONENTS

This is a continuation of application Ser. No. 580,003 filed May 22, 1975 now abandoned.

The foregoing abstract is not to be taken as limiting the invention of this application, and in order to understand the full nature and extent of the technical disclosure of this application, reference must be made to the accompanying drawing and the following detailed description.

The present invention relates to an apparatus for treating tire components. More particularly, the invention relates to apparatus for treating in running lengths the curable rubber-like compounds of which tire components are formed by subjecting such stock to controlled dosage of high voltage electron beam radiation.

It is known that treatment of compounds of rubber and rubber-like material with high voltage electron beam radiation can improve some physical properties of the compounds. Apparatus for moving sheet and strip materials continuously through a field of electron radiation heretofore available has not been fully satisfactory and has lacked versatility. In particular, available apparatus has not been satisfactorily adapted to treatment of tire making components of widely varying width.

A principal object of the present invention, therefore, is the provision of apparatus capable of handling and treating by electron radiation tire components of diverse dimensions on an efficient production scale.

To acquaint those skilled in the related arts with the principles of the invention, a presently preferred embodiment illustrative of the best mode now contemplated for the practice thereof, will be described herein by and in connection with the attached drawings wherein.

Figure 1:
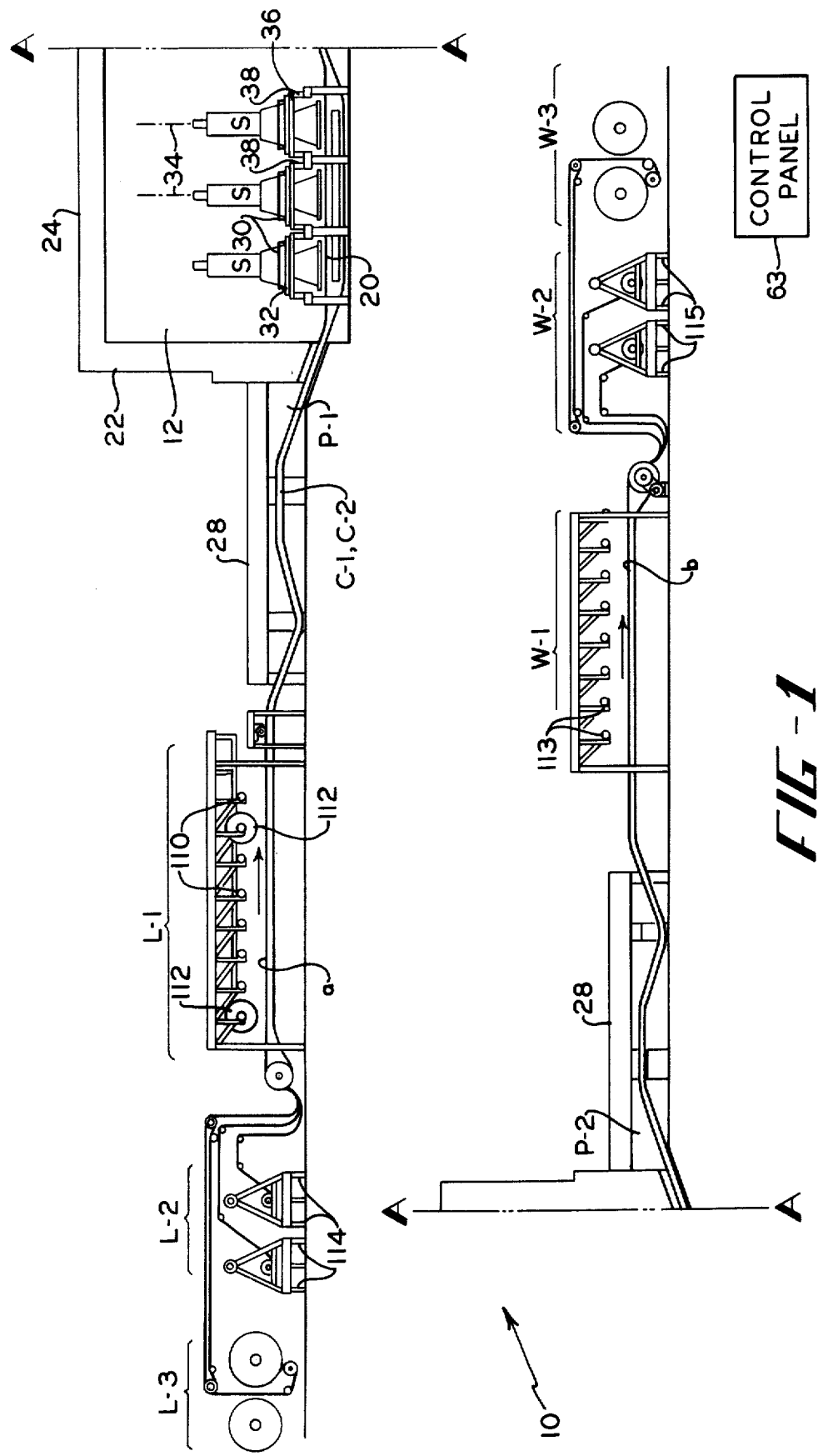
FIG. 1 is a schematic elevation view of apparatus according to the invention, the view being divided in two parts at a plane represented by the line A—A.
Figure 2:
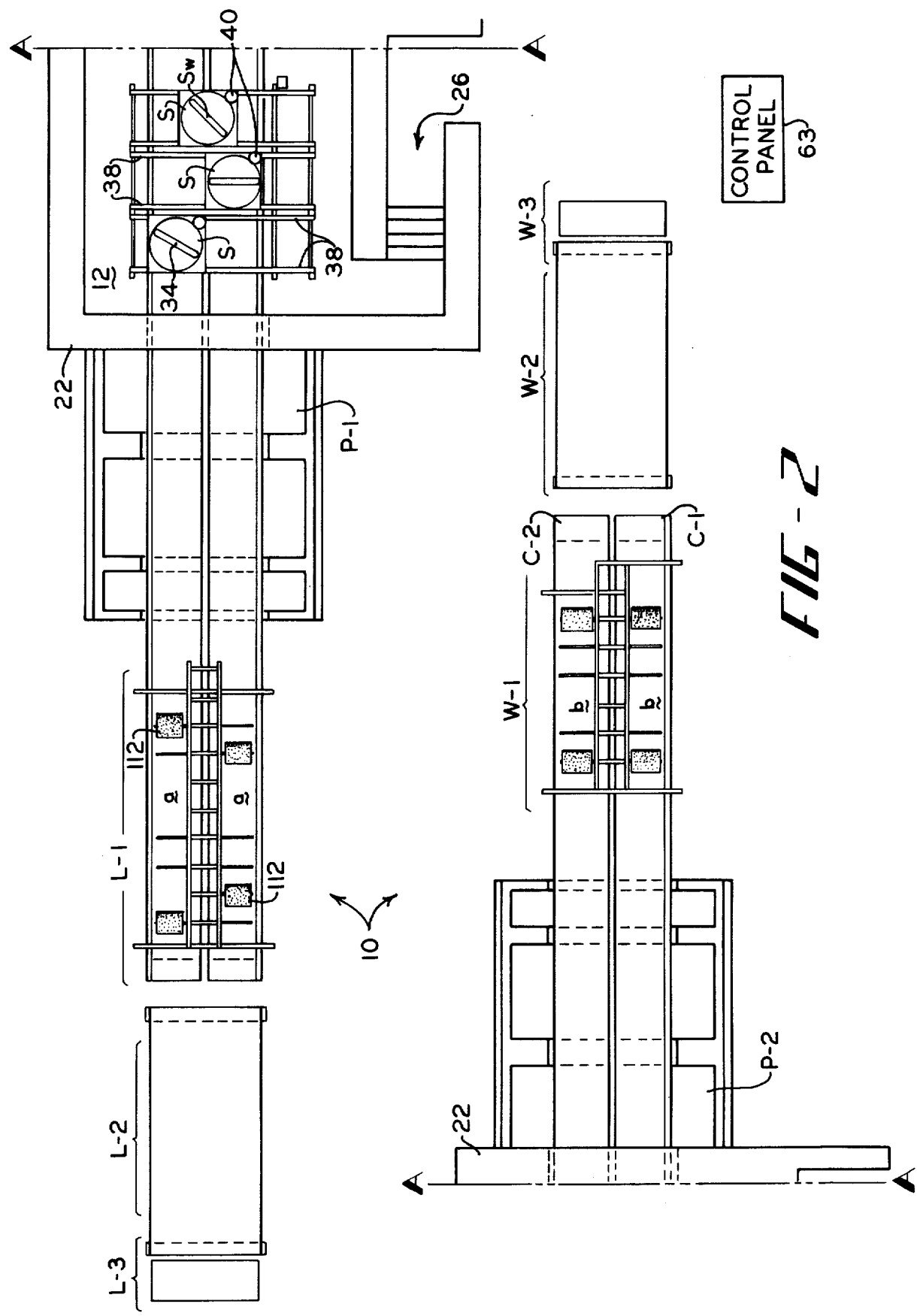
FIG. 2 is a schematic plan view of the apparatus of FIG. 1, similarly divided by the plane represented by the line A—A.

FIGS. 3, 4, and 5 are schematic diagrams of control circuits of the apparatus of FIGS. 1 and 2.

The apparatus 10 shown synoptically in the drawings, particularly in FIGS. 1 and 2, includes a treatment chamber 12 housing three high-voltage electron beam accelerators, three groups, L-1, L-2, and L-3, of stock letoffs, a pair of conveyors C-1, C-2, and three groups W-1, W-2, and W-3, of windups. The two conveyors extend through the chamber from their receiving ends *a* associated with the letoffs to their delivery ends *b* associated with the windups. Labyrinthine passageways P-1, P-2 provide entry to and exit from the chamber 12 for the conveyors, which carry, and control, the components to be treated in a horizontal plane 20 referred to herein as the treatment plane. For brevity, each of the high voltage electron beam accelerators is referred to herein as a Source S.

Three high-voltage electron beam radiation Sources S are mounted in the chamber 12 to direct energy onto the treatment plane 20. These Sources S are commercial units supplied by High Voltage Engineering Corporation, of Burlington, Mass. 01803.

The chamber 12 is of known construction, being totally enclosed by shielding walls 22 and roof 24 to protect personnel from the hazards known to be associated with such high voltage electron beam radiation. Conveniently, the chamber is located at least partly below grade, that is, below the general floor on ground level, thus making use of the earth as a portion of the shielding. The chamber is equipped with an aircirculating blower (not shown) capable of scavenging ozone from the chamber. It is also desirable that the chamber be equipped with means for preventing human entry or presence during operation of one or more of the sources. Personnel access is provided by a shielded entryway 26 arranged to prevent the escape of radiation to the space surrounding the chamber. A chilled water circulating system is provided to remove excess heat developed by the radiation energy in the chamber and conveyors therein.

The labyrinthine passages P-1, P-2 provide a vertically zig-zag path through which the conveyors travel and through which straight line radiation is prevented from escape. The passages are, for convenience in maintenance, provided with roofs 28 constructed of heavy reinforced concrete sections which are removable.

In accordance with a feature of the invention, the three identical Sources S are mounted in an identical manner, about to be described, in the chamber 12. One of the Sources serves additionally as an in-place spare, providing for uninterrupted operation in the event of failure of one of the other Sources. Inasmuch as the Sources and their mountings are identical, the description of one will suffice to describe each. Each Source is provided with a mounting ring 30 which is attached to the horizontal support plate 32 with its central radiation beam axis 34 extending normal to the treatment plane 20. The support plate is supported rotatably on a traverse plate 36 which is in turn mounted translatably on a pair of rails 38 which extend transversely of the conveyors. The arrangement is such that the elongate window Sw of the Source can be moved to any location laterally of the conveyors and can as well be rotated about its own vertical axis such that the length of the window Sw through which the electron beam is projected can be oriented at any angle with respect to the direction of travel of the conveyors, thereby enabling the width of the beam scan to be matched to the width of the tire component being treated.

The support plate 32 and the Source thereon are together rotated about the central axis 34 by a rotation drive, FIG. 3, mounted on the traverse plate 36, a pinion 42 on the rotation drive motor 40 being drivingly in mesh with a gear 44 carried by the support plate.

Means, best seen in FIG. 4, for moving the traverse plate across the conveyors C-1, C-2 is provided by a rack 46 and pinion 48 traverse drive including a traversing motor 50 by which the Source, support plate, and the traverse plate are moved as a unit across the conveyors.

Referring also to FIGS. 3 and 4, a position encoder 60, for transmitting the actual angular position of the window Sw, relative to the direction of travel of the conveyor is mounted on the traverse plate and coupled, by a pinion 61 and gear 62, to be rotated proportionally by the support plate 32 as the latter is rotated by the motor 40. Signals emitted by the encoder 60 are transmitted to remote control means in the panel 63 situated outside the chamber and specifically to a signal plusminus adder 64 therein. In the adder, the signal from the encoder is compared with the angular position preset in the angle selector 66 and any difference between the actual and the preset positions generates a signal communicated to an amplifier 68. The output from the amplifier activates the drive 40 to rotate the source to the preset angle.

In FIG. 4, a position encoder 70 is connected, by a pinion 71 engaging the rack 46, to the traverse plate and to the rails supporting it. The actual position of the traverse plate and the encoder 70 provides a signal fed back to control means comprising a plus-minus adder 74, in the panel 63, and in which the actual position signal is compared to the traverse position preset in the selector 76. Any difference is communicated by way of the amplifier 78 to the traversing drive motor 50 which moves the traverse plate and the Source to the preset position. The arrangement provides that an operator outside and remote from the chamber can position each source with respect to the particular component to be treated without entering the chamber and can readily readjust such positions to suit a change in dimensions from one to another such component. Lockout switches prevent the operator from changing from one operating mode to another without first inactivating the Sources S.

The beam energy output per unit time and the dose rate, to which the rate of travel of components carried by the conveyor(s) is correlated can be measured by measuring the voltage induced in a wire placed in the beam path (FIG. 4). The wire is connected by appropriate electrical terminations to produce linear output and with means for displaying the measured voltage.

The two conveyors are provided with completely independent drives which are conventional and identical and serve to control the speed of each of the conveyors independently of the other. Referring to FIG. 5, the drive arrangement for conveyor C1 is illustrated and described, the numerals applied to the elements thereof being identically applied to like elements in the drive arrangement of conveyor C2 except for the addition of a prime ('). Conveyor C1 is provided with a drive motor 80 drivingly connected by way of a gear reduction 82 to the conveyor. The speed control circuit includes a conventional tachometer 84 mechanically connected to the motor and a plus-minus adder 86 connected to receive the output from the tachometer. The adder is also connected to a speed control potentiometer 88, and receives a signal representing a preset speed which in the adder 86 is compared with the signal received from the tachometer 84. The difference is communicated to an amplifier 90 and thence to the motor 80 to regulate the speed thereof.

In accordance with the invention, the drives for the respective conveyors are also provided with the capability of being driven synchronously as one conveyor. In the speed control arrangement of conveyor C2 a selector switch 92 is interposed between the speed control preset potentiometer 88' and the adder 86'. When the two conveyors are being operated independently of one another, selector switch 92' is made between the potentiometer 88' and the adder 86' rendering the circuit identical to that described in connection with conveyor C1. In order to lock the two conveyor drives into complete synchronism, a digital or pulse tachometer 94,94' is mechanically connected respectively to each of the drive motors 80,80'. The respective signals emitted by the pulse tachometers are communicated separately to a digital comparator 96, the output of which is communicated, by way of the selector switch 92, to the adder 86' in the control circuit of conveyor C2. In this way, the driving speed of the motor 80' is slaved to the driving speed of the motor 80 of conveyor C1 such that the two conveyors operate in complete synchronism, particularly in their carrying surfaces to the extent that they can be used as one single conveyor.

The letoffs, L-1, L-2, L-3, and the windups, W-1, W-2, W-3, previously mentioned, are individually each well known devices. In the combination according to the invention, the letoffs are arranged in three groups. Group L-1 provides a number of cantilevered shafts 110 each capable of accommodating a core 112 on which is wound a running length supply of a particular tire component to be treated in the apparatus. The arrangement provides that tire building components such as chippers and chafers and like narrow strips can be placed on either one or both of the parallel conveyors, being paid off individually from the cores 12, and in sufficient number to utilize the full width of one, the other, or both, of the conveyors, as well as the available capacity of the electron beam source associated with such conveyor. In the windups W-1 each of the individual windups 113 receive and rewind one of the treated running lengths as received from the associated conveyor after its treatment.

In the letoffs L-1,L-2 and the windups W-1,W-2, provision is made for handling components of widths not greater than the width of the individual conveyors. A component from either of the two letoffs L-2 can be supplied to either of the conveyors, transported by the selected conveyor through the chamber for electron beam radiation treatment and rewound as received from the conveyor by a selected one of the two windups W-2. Each of the letoffs L-2 and of the windups W-2 are provided with wheels 114,115 providing means for readily disposing them in suitable alignment with the selected conveyor.

In the letoff L-3 and in the windup W-3 a component of width greater than the width of either conveyor is unwound and transported by an overhead belt conveyor from which it is applied to the surfaces of the two side-by-side conveyors operating in synchronism, is transported by the two conveyors C1,C2, acting as one, through the chamber 12, and is received from the delivery ends of the conveyors and rewound by the windup W-3.

The apparatus combination described provides the particular advantage over apparatus known heretofore in its capability of handling and treating a diverse variety of tire building components used in the manufacture of tires on a virtually continuous basis, whereas heretofore such treatment has been limited to a batchtype treatment. A unique advantage is that of having the capability of handling, and treating, in the same enclosure chamber, materials of different dimensions and, therefore, requiring different dosage rates both continuously and concurrently, coupled with the facility to handle and treat single components of significantly greater width as a result of the provision of a plurality of conveyors operable either independently of one another or in locked synchronous conveying relation.

It will be understood that tire making components in sheet or strip form will normally and preferably be associated with a cloth or equivalent sheet or strip as is customarily used in winding such components in rolls. In the apparatus described such cloth sheet or strip preferably accompanies the component being treated from its supply roll on one of the letoffs on the conveyor through the treatment chamber, and is rewound with the component by the selected windup.

In the disclosure, the term component has been used to designate any of the sheet and strip materials used in building tires, and should be so understood in the claims. Examples of such components which can be handled by the apparatus include but are not limited to gum stock, liner, ply stock, chafer, and chipper. Such components may or may not include cord, fabric, or wire reinforcing elements.

While certain representative embodiments and details have been shown for the purpose of illustrating the invention, it will be apparent to those skilled in the art that various changes and modifications may be made therein without departing from the spirit or scope of the invention.

We claim:

1. Apparatus for treating tire making components including tire ply and tire gum stock by controlled exposure to high voltage electron beam radiation, including a plurality of sources of said radiation, a walled chamber housing said sources, an entry and an exit each having a labyrinthine passage between said chamber and the surrounding space, conveyor means comprising a plurality of conveyors each having a conveying surface defined by closely spaced rigid bar slats extending normal to the travel direction and cooperable with another of said plurality of conveyors to provide a common conveying surface extending across both said conveyors, said conveyors being in close parallel side-by-side array for carrying said components through said chamber, let-off means for delivering a running length of a selected one of said components to said conveyor means, wind-up means for rewinding said running length as received from said conveyor means after treatment by said radiation, source mounting means respectively supporting each of said sources above and in operative relation to said conveyor means, said mounting means including a pair of spaced parallel rails bridging said conveyor means, a traversing plate supported on said rails for movement across said conveyor means, a support plate fixed rotatably on said traversing plate for rotation about a vertical axis and carrying the respectively associated source thereon, drive means respectively connected to traverse and to rotate the respectively associated said plates, control means situated outside the chamber, and means responsive to said control means to energize said drive means, whereby each said source can be positioned independently of the others thereof relative to said conveyor means.

2. An apparatus for treating a plurality of diverse tire making components including a tire ply stock and gum stock by controlled exposure to high voltage electron beam radiation, including a source of said radiation, a walled chamber housing said source, an entry and an exit each having a labyrinthine passage between said chamber and the surrounding space, conveyor means for controlling movement of said components through said chamber, let-off means for delivering a running length of a selected one of said components to said conveyor means, wind-up means for rewinding said running length as received from said conveyor means after treatment by said radiation, the improvement wherein said conveyor means comprises a plurality of conveyors disposed in side-by-side parallel array, said conveyors each having a conveying surface defined by closely spaced rigid bar slats extending thereacross, said surfaces cooperable to define a common conveying surface wider than any one of said plurality of conveyors, a plurality of identical and independent motor drives each drivingly connected respectively to only one of said conveyors and operable to drive its respectively associated conveyor at a speed different from and independent of the speed of another of said conveyors, whereby each conveyor can travel through said enclosure at a speed proportional to the radiation dosage appropriate to a particular tire component carried thereon.

3. Apparatus as claimed in claim 2, comprising a master/slave speed control circuit interconnecting said plurality of identical and independent motor drives and operable to lock said drives and the respective conveyors driven thereby in synchronous speed relation one to another, and wherein said let-off means includes a plurality of let-offs each disposed to supply a running length of unradiated component to respective ones of said conveyors, and at least one let-off wider than any one of said conveyors disposed to supply a running length of unradiated component wider than any one of said conveyors to a pair of said conveyors having said common conveying surface while said pair are moving synchronously.

* * * * *